United States Patent [19]
Kim et al.

[11] Patent Number: 5,946,547
[45] Date of Patent: Aug. 31, 1999

[54] LIQUID CRYSTAL DISPLAY DEVICE FABRICATION METHODS WITH REDUCED NUMBERS OF PATTERNING STEPS

[75] Inventors: Dong-gyu Kim; Byoung-sun Na, both of Kyungki-do, Rep. of Korea

[73] Assignee: Samsung Electronics Co., Ltd., Rep. of Korea

[21] Appl. No.: 08/766,757

[22] Filed: Dec. 13, 1996

[30] Foreign Application Priority Data

Dec. 22, 1995 [KR] Rep. of Korea ................. 95-54698

[51] Int. Cl.⁶ ................................................ H01L 21/00
[52] U.S. Cl. .......................... 438/30; 438/149; 438/158
[58] Field of Search .............................. 438/149, 158, 438/29, 30

[56] References Cited

U.S. PATENT DOCUMENTS

| | | | |
|---|---|---|---|
| 4,778,258 | 10/1988 | Parks et al. | 350/336 |
| 4,855,806 | 8/1989 | Parks et al. | 357/59 |
| 4,918,504 | 4/1990 | Kato et al. | 357/23.7 |
| 4,933,296 | 6/1990 | Parks et al. | 437/40 |
| 5,041,888 | 8/1991 | Possin et al. | 357/23.7 |
| 5,148,248 | 9/1992 | Possin et al. | 357/23.7 |
| 5,346,833 | 9/1994 | Wu | 437/4 |
| 5,466,618 | 11/1995 | Kim | 437/40 |
| 5,482,173 | 1/1996 | Park et al. | 216/23 |
| 5,496,752 | 3/1996 | Nasu et al. | 437/41 |
| 5,498,573 | 3/1996 | Whetten | 437/192 |
| 5,546,207 | 8/1996 | Kim | 349/122 |
| 5,668,379 | 9/1997 | Ono et al. | 257/59 |
| 5,694,185 | 12/1997 | Oh | 349/46 |
| 5,742,365 | 4/1998 | Seo | 349/43 |

*Primary Examiner*—John F. Niebling
*Assistant Examiner*—Christopher Lattin
*Attorney, Agent, or Firm*—Myers Bigel SIbley & Sajovec

[57] ABSTRACT

Liquid crystal display (LCD) devices are fabricated by forming a patterned gate layer on a substrate and forming an insulating layer, a semiconductor layer and a conductive layer on the patterned gate layer. The conductive layer is patterned to define a data line, a source electrode, a drain electrode and a pixel electrode for the LCD device. A passivation layer is formed on the patterned conductive layer. The passivation layer is removed from on at least a portion of the pixel electrode. At least a portion of the semiconductor layer between the data line and the pixel electrode is also simultaneously removed. LCD devices may thereby be fabricated with reduced numbers of patterning steps compared to conventional fabrication methods.

23 Claims, 4 Drawing Sheets

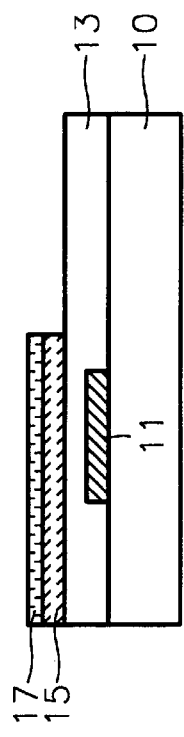
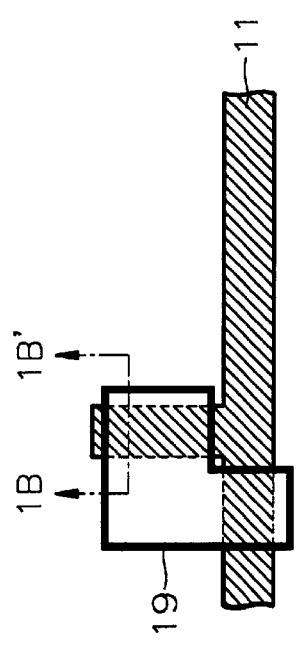
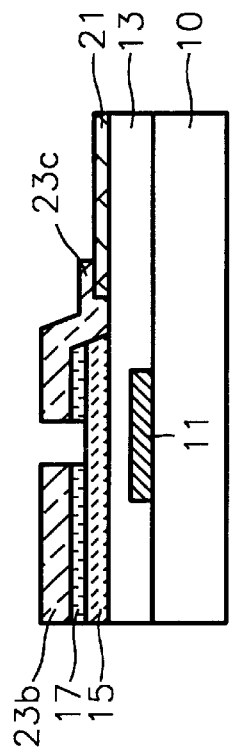
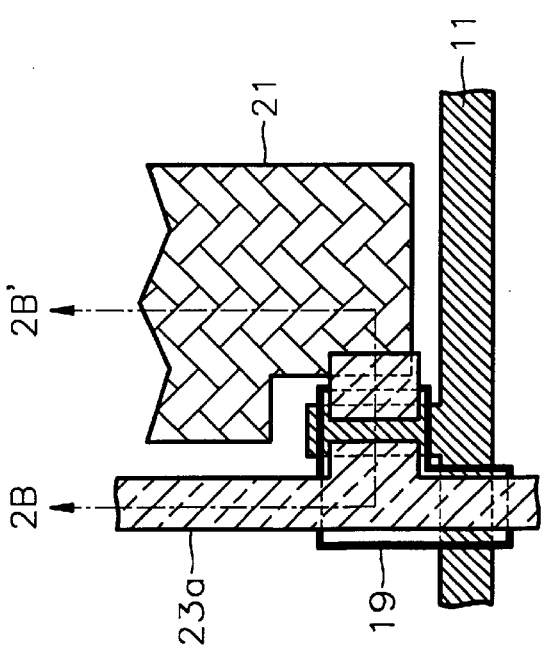

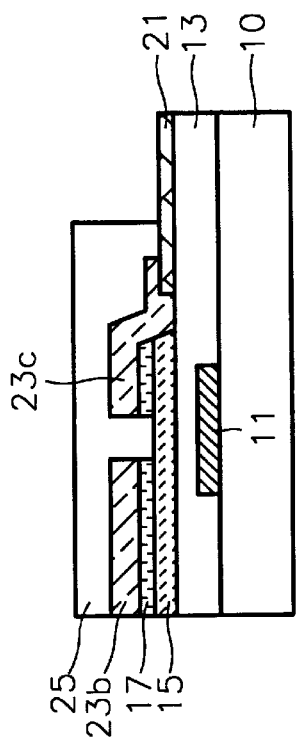
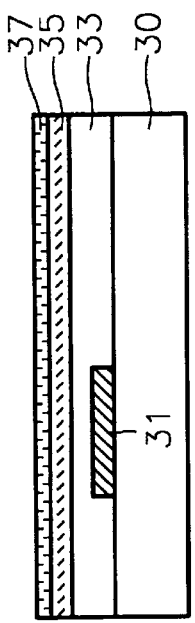
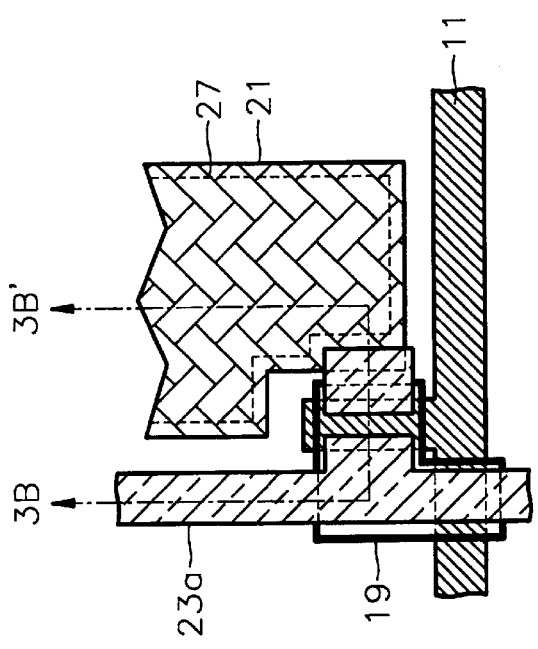
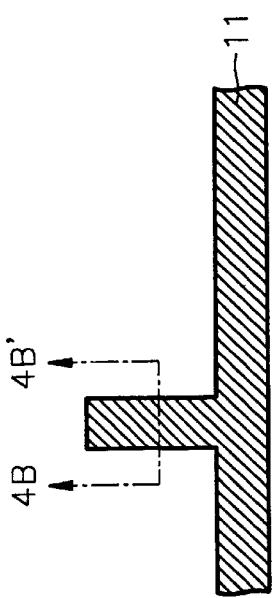
FIG. 3B (PRIOR ART)
FIG. 4B
FIG. 3A (PRIOR ART)
FIG. 4A

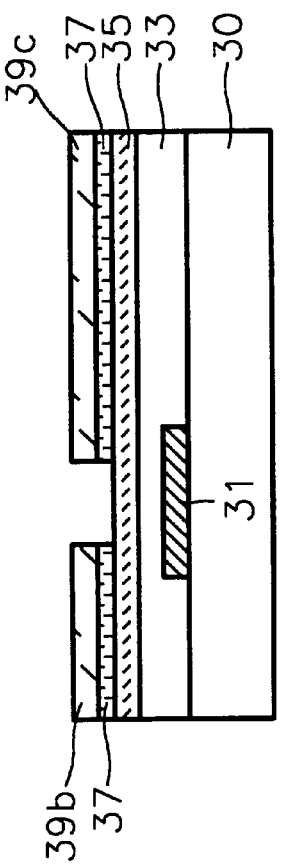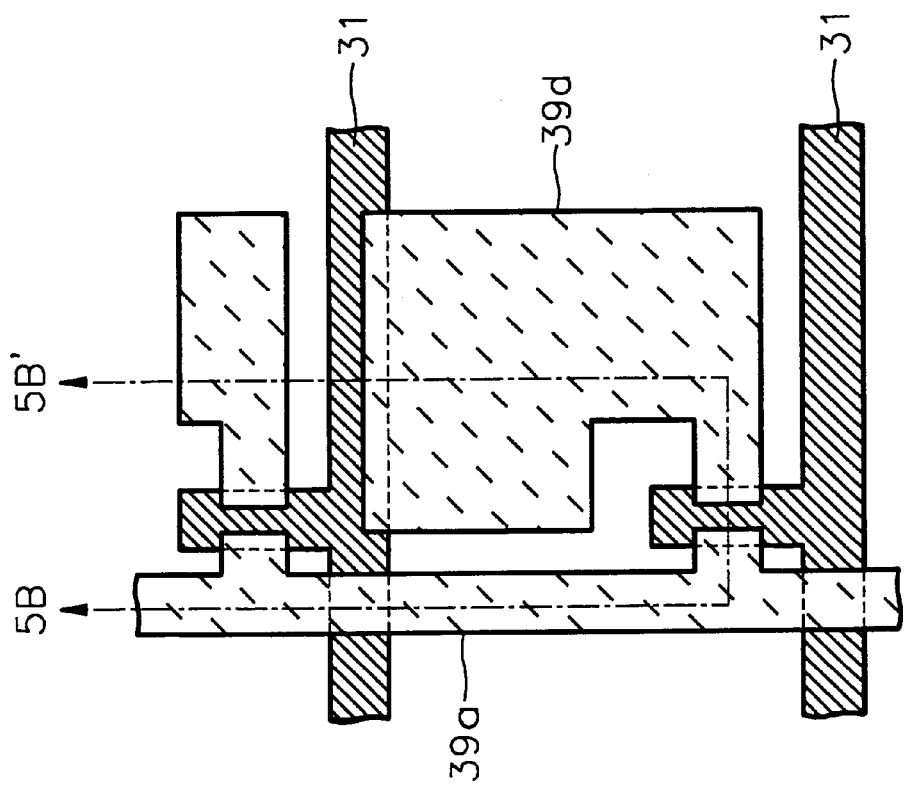
FIG. 5B
FIG. 5A

5,946,547

LIQUID CRYSTAL DISPLAY DEVICE FABRICATION METHODS WITH REDUCED NUMBERS OF PATTERNING STEPS

FIELD OF THE INVENTION

This invention relates to microelectronic device fabrication methods, and more particularly to fabrication methods for liquid crystal display (LCD) devices.

BACKGROUND OF THE INVENTION

Flat panel display devices are widely used for image displays. Flat panel display devices include liquid crystal displays (LCD), plasma display panels, and electroluminescent displays. Flat panel displays can replace bulky displays, such as cathode ray tubes (CRT). In particular, LCD devices have been widely used as replacements for bulky CRT displays.

FIGS. 1A–3A are top plan views illustrating a conventional LCD device during intermediate fabrication steps, and FIGS. 1B–3B are cross-sectional views taken along the line 1B–1B' through 3B–3B' of respective FIGS. 1A–3A. As shown in FIGS. 1A and 1B, a metal layer, such as chromium (Cr), aluminum (Al) or tantalum (Ta), is formed on a substrate 10. A first patterning step is performed to form a patterned gate layer 11 from the metal layer. The patterned gate layer 11 is used to define a gate electrode for a thin film transistor (TFT). The patterned gate layer may also define gate wiring, a gate pad electrode, additional capacity electrodes, and other elements.

Still referring to FIGS. 1A and 1B, an insulating layer 13 is formed on the surface of the substrate 10 including on the patterned gate layer 11. A semiconductor layer comprising an amorphous silicon layer 15 and a doped amorphous silicon layer 17 is then formed. A second patterning step is then used to pattern the semiconductor layer, to form a semiconductor layer pattern 19. The semiconductor layer which is formed on a gate pad electrode (not illustrated) is also patterned. It will be understood that patterning may be performed using photolithography and/or other conventional microelectronic patterning techniques.

Referring now to FIGS. 2A and 2B, a conductive layer such as indium tin oxide (ITO) is formed on the substrate. Then, a third patterning step is performed to form pixel electrode 21. A metal, such as Cr, Al or Ta is then formed on the surface of the substrate 11. A fourth patterning step is then performed to form a data line 23a, a source electrode 23b and a drain electrode 23c. It will be noted that doped amorphous silicon layer 17 is also etched, to thereby partially expose the undoped amorphous silicon layer 15 over the patterned gate electrode 11.

Referring now to FIGS. 3A and 3B, a passivation layer 25 is formed on the substrate and a fifth patterning step is performed. In this step, the passivation layer 25 formed on the pixel electrode 21 is etched and the passivation layer 25 and the insulating layer 23 formed on the gate pad electrode (not shown) are also etched. Reference number 27 of FIG. 3A illustrates the region of the passivation layer 25 which is etched.

Unfortunately, as described above, conventional methods of fabricating LCD devices generally require at least five patterning steps. As is well known, the number of patterning steps can increase manufacturing costs and reduce manufacturing yields.

SUMMARY OF THE INVENTION

It is therefore an object of the present invention to provide improved methods of fabricating liquid crystal display (LCD) devices.

It is another object of the present invention to provide LCD device fabrication methods which can utilize fewer patterning steps than conventional fabrication methods.

These and other objects are provided, according to the present invention, by methods of fabricating LCD devices which need only use three patterning steps. In particular, according to first methods of the present invention, LCD devices are fabricated by forming a patterned gate layer on a substrate and forming an insulating layer, a semiconductor layer and a conductive layer on the patterned gate layer. The conductive layer is then patterned to define a data line, a source electrode, a drain electrode and a pixel electrode for the LCD device. A passivation layer is formed on the patterned conductive layer which defines the data line, the source electrode, the drain electrode and the pixel electrode. The passivation layer is then removed from at least a portion of the pixel electrode. Preferably, when the passivation layer is removed, at least a portion of the semiconductor layer between the data line and the pixel electrode is simultaneously removed.

It will be understood that the semiconductor layer preferably comprises an undoped semiconductor layer and a doped semiconductor layer on the undoped semiconductor layer. Amorphous silicon layers are preferably used. The patterned gate layer is preferably a patterned first metal layer, and the conductive layer is preferably a second metal layer. The first metal layer may comprise a layer of molybdenum and a layer of aluminum.

According to other method aspects of the present invention, LCD devices are fabricated by forming a patterned gate layer, an insulating layer, a semiconductor layer, and a conductive layer on a substrate. The conductive layer and the semiconductor layer are patterned adjacent the patterned gate layer, to define spaced apart source and drain regions having spaced apart source and drain electrodes thereon. A passivating layer is formed on the spaced apart source and drain electrodes. The passivating layer remote from the patterned gate layer is patterned to expose at least part of the conductive layer. The exposed conductive layer and the semiconductor layer remote from the patterned gate layer are patterned to define a spaced apart data line and pixel electrode.

According to this aspect, the semiconductor layer preferably comprises an undoped semiconductor layer and a doped semiconductor layer on the undoped semiconductor layer. The step of patterning the conductive layer and the semiconductor layer adjacent the patterned gate layer preferably comprises the step of patterning the conductive layer and the doped semiconductor layer adjacent the patterned gate layer without patterning the undoped semiconductor layer adjacent the patterned gate layer. The step of patterning the exposed conductive layer and the semiconductor layer remote from the patterned gate layer preferably comprises the step of patterning the exposed conductive layer, the doped semiconductor layer and the undoped semiconductor layer remote from the patterned gate layer.

Accordingly, LCD devices can be fabricated using only three patterning steps. This is less than the number of patterning steps which are generally used for conventional LCD fabrication methods. Manufacturing costs can thereby be lowered and yields can be increased.

BRIEF DESCRIPTION OF THE DRAWINGS

FIGS. 1A–3A are top plan views of a conventional method of fabricating liquid crystal display (LCD) devices, during intermediate fabrication steps.

FIGS. 1B–3B are cross-sectional views taken along lines 1B–1B' through 3B–3B' of FIGS. 1A–3A respectively.

FIGS. 4A–6A are top plan views of methods of fabricating LCD devices according to the present invention, during intermediate fabrication steps.

FIGS. 4B–6B are cross-sectional views taken along lines 4B–4B' through 6B–6B' corresponding to FIGS. 4A–6A.

DETAILED DESCRIPTION OF PREFERRED EMBODIMENTS

Figure 6B:
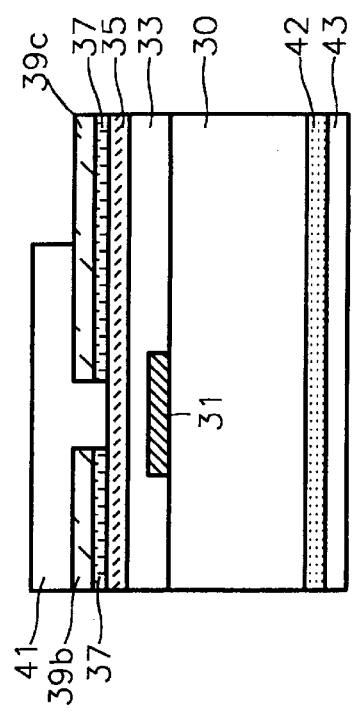

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIGS. 4A and 4B, a first metal layer, such as chromium (Cr), aluminum (Al), tantalum (Ta) or molybdenum (Mo) or titanium (Ti) is formed on a substrate 30 to a thickness of about 2000 Å to about 4000 Å. The first metal layer is then patterned in a first patterning step using photolithography or other conventional patterning methods, to form a patterned gate layer 31. The patterned gate layer 31 may be used to form a gate electrode of a thin film transistor, gate wiring, gate pad electrodes, additional capacity electrodes, and other LCD device elements.

As illustrated in FIGS. 3A and 3B, the first metal layer is a monolayer. However, the first metal layer may also be formed as a dual layer including molybdenum and aluminum, or other combinations of materials. When the first metal layer is formed as a molybdenum/aluminum layer, aluminum may be used as a lower layer to reduce resistance. The molybdenum can be used to prevent hillocks of aluminum in the gate pad electrode and to improve the adhesion of subsequent layers. The aluminum and molybdenum can be simultaneously etched using wet etching.

Still referring to FIGS. 4A and 4B, an insulating layer 33 such as a silicon nitride or silicon dioxide layer, is formed on the surface of the substrate 30, including on the patterned gate layer 31. Insulating layer 33 may have a thickness of between about 3000 Å to about 4000 Å. Then, a semiconductor layer is formed on the insulating layer 33. The semiconductor layer preferably comprises an undoped amorphous silicon layer 35 having a thickness of about 2000 Å and a doped amorphous silicon layer 37 having a thickness of about 500 Å.

Referring now to FIGS. 5A and 5B, a conductive layer, referred to as a second metal layer, comprising Cr, Al, Ta, Ti, Mo or ITO is formed on the doped amorphous silicon layer 37. A second patterning step is then performed to define a data line 39a, a source electrode 39b, a drain electrode 39c and a pixel electrode 39d. As shown, the doped amorphous silicon layer 37 is also etched to thereby at least partially expose the undoped amorphous silicon layer 35 adjacent the patterned gate layer.

It will be understood that when a transparent conductive layer such as ITO is used as the second metal layer, the resultant LCD devices may be transmission-type thin film transistor LCD devices. Conversely, when an opaque metal such as Al, Cr, Mo or Ti is used for the second metal layer, the LCD devices may be reflection-type thin film transistor LCD devices or in-plane structure thin film transistor LCD devices.

Figure 6D:
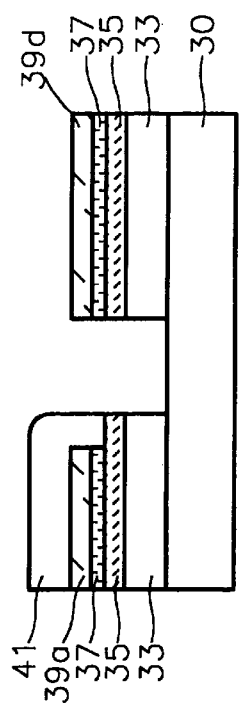
FIGS. 6C and 6D are cross-sectional views taken along lines 6C–6C' and 6D–6D' of FIG. 6A.
Figure 6A:
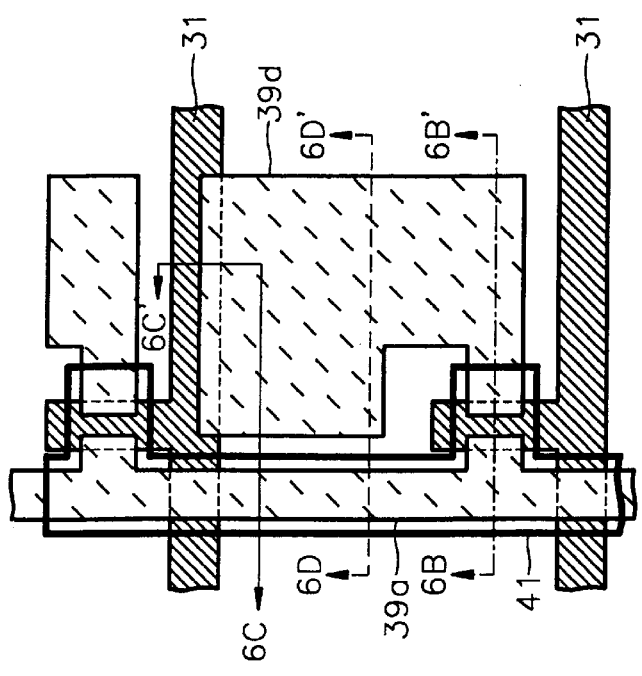
Figure 6C:
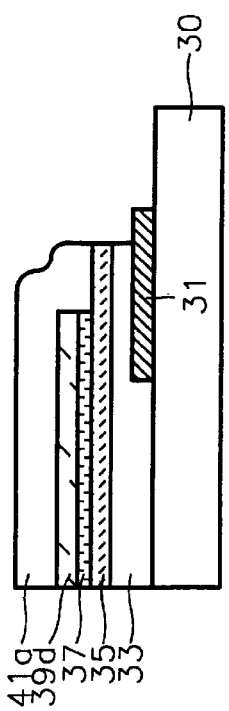

Referring now to FIGS. 6A–6D, a passivation layer is formed on the substrate 30 and a third patterning step is performed on the passivation layer. Simultaneously, amorphous silicon layers 37 and 35 and insulating layer 33 are etched between the data line 39a and the pixel electrode 39d. Accordingly, as shown in FIG. 6C, a passivation layer pattern 41a is formed on the pixel electrode 39d to prevent a short circuit between the pixel electrode 39d and the gate pattern 31. As also shown in FIG. 6D, the passivation layer 41 is formed between the pixel electrode 39d and the data line 39a to prevent short circuits. Moreover, the passivation layer 41, the amorphous silicon layer 35 and the insulating layer 33, which are formed on a gate pad electrode (not shown) are also etched, to thereby expose the gate pad electrode.

When LCD devices according to the present invention are used as reflection-type LCD devices, a reflective layer 42 (FIG. 6B) such as aluminum may be formed on the rear surface of the substrate 30 opposite the patterned conductive layer 31, to prevent loss of the light which penetrates through the pixel electrode. In order to improve reliability, a second passivation layer 43 may also be formed on the reflective layer 42.

Accordingly, as described above, methods of fabricating LCD devices according to the present invention need only use three patterning steps. Manufacturing costs may thereby be reduced and manufacturing yields can be increased compared to conventional fabrication methods in which at least five patterning steps are generally used.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of fabricating a liquid crystal display device comprising the steps of:

forming a patterned gate layer on a substrate;

forming an insulating layer, a semiconductor layer and a conductive layer on the patterned gate layer;

patterning the conductive layer to define a data line, a source electrode, a drain electrode and a pixel electrode for the liquid crystal display device;

forming a passivation layer on the patterned conductive layer which defines the data line, the source electrode, the drain electrode and the pixel electrode; and simultaneously removing the passivation layer from at least a portion of the pixel electrode and removing at least a portion of the semiconductor layer between the data line and the pixel electrode.

2. A method according to claim 1 further comprising the step of forming a reflective layer on the substrate, opposite the patterned gate layer.

3. A method according to claim 1:

wherein the semiconductor layer comprises an undoped semiconductor layer, and a doped semiconductor layer on the undoped semiconductor layer.

4. A method according to claim 3 wherein the doped semiconductor layer and the undoped semiconductor layer are a doped amorphous silicon layer and an undoped amorphous silicon layer, respectively.

5. A method according to claim 1 wherein the patterned gate layer is a patterned first metal layer and wherein the conductive layer is a second metal layer.

6. A method according to claim 5 wherein the first metal layer comprises a layer of molybdenum and a layer of aluminum.

7. A method of fabricating a liquid crystal display device comprising the steps of:

forming a patterned gate layer, an insulating layer, a semiconductor layer, and a conductive layer on a substrate;

patterning the conductive layer and the semiconductor layer adjacent the patterned gate layer, to define spaced apart source and drain regions having spaced apart source and drain electrodes thereon;

forming a passivation layer on the spaced apart source and drain electrodes;

patterning the passivation layer remote from the patterned gate layer to expose at least part of the conductive layer; and patterning the exposed conductive layer and the semiconductor layer remote from the patterned gate layer, to define a spaced apart data line and a pixel electrode.

8. A method according to claim 7:

wherein the semiconductor layer comprises an undoped semiconductor layer and a doped semiconductor layer on the undoped semiconductor layer;

wherein the step of patterning the conductive layer and the semiconductor layer adjacent the patterned gate layer comprises the step of patterning the conductive layer and the doped semiconductor layer adjacent the patterned gate layer without patterning the undoped semiconductor layer adjacent the patterned gate layer; and wherein the step of patterning the exposed conductive layer and the semiconductor layer remote from the patterned gate layer comprises the step of patterning the exposed conductive layer, the doped semiconductor layer and the undoped semiconductor layer remote from the patterned gate layer.

9. A method according to claim 8 wherein the doped semiconductor layer and the undoped semiconductor layer are a doped amorphous silicon layer and an undoped amorphous silicon layer, respectively.

10. A method according to claim 7 wherein the patterned gate layer is a patterned first metal layer and wherein the conductive layer is a second metal layer.

11. A method according to claim 10 wherein the first metal layer comprises a layer of molybdenum and a layer of aluminum.

12. A method according to claim 7 further comprising the step of forming a reflective layer on the substrate, opposite the patterned gate layer.

13. A method of fabricating a liquid crystal display device comprising the steps of:

forming a patterned gate layer on a substrate;

forming an insulating layer, a semiconductor layer and a conductive layer on the patterned gate layer;

patterning the conductive layer to define a data line, a source electrode, a drain electrode and a pixel electrode for the liquid crystal display device;

forming a passivation layer on the patterned conductive layer which defines the data line, the source electrode, the drain electrode and the pixel electrode;

removing the passivation layer from at least a portion of the pixel electrode; and forming a reflective layer on the substrate, opposite the patterned gate layer.

14. A method according to claim 13 wherein the step of removing the passivation layer further comprises the step of:

simultaneously removing at least a portion of the semiconductor layer between the data line and the pixel electrode.

15. A method according to claim 13:

wherein the semiconductor layer comprises an undoped semiconductor layer, and a doped semiconductor layer on the undoped semiconductor layer.

16. A method according to claim 15 wherein the doped semiconductor layer and the undoped semiconductor layer are a doped amorphous silicon layer and an undoped amorphous silicon layer, respectively.

17. A method according to claim 13 wherein the patterned gate layer is a patterned first metal layer and wherein the conductive layer is a second metal layer.

18. A method according to claim 17 wherein the first metal layer comprises a layer of molybdenum and a layer of aluminum.

19. A method of fabricating a liquid crystal display device comprising the steps of:

forming a patterned gate layer on a substrate;

forming an insulating layer, a semiconductor layer and a conductive layer on the patterned gate layer;

patterning the conductive layer to define a data line, a source electrode, a drain electrode and a pixel electrode for the liquid crystal display device;

forming a passivation layer on the patterned conductive layer which defines the data line, the source electrode, the drain electrode and the pixel electrode; and simultaneously removing the passivation layer from at least a portion of the pixel electrode and removing at least a portion of the semiconductor layer between the data line and the pixel electrode;

wherein the patterned gate layer is a patterned first metal layer and wherein the conductive layer is a second metal layer.

20. A method according to claim 19 further comprising the step of forming a reflective layer on the substrate, opposite the patterned gate layer.

21. A method according to claim 19:

wherein the semiconductor layer comprises an undoped semiconductor layer, and a doped semiconductor layer on the undoped semiconductor layer.

22. A method according to claim 21 wherein the doped semiconductor layer and the undoped semiconductor layer are a doped amorphous silicon layer and an undoped amorphous silicon layer, respectively.

23. A method according to claim 19 wherein the first metal layer comprises a layer of molybdenum and a layer of aluminum.

* * * * *